US007737654B2

(12) United States Patent
Anderson

(10) Patent No.: US 7,737,654 B2
(45) Date of Patent: Jun. 15, 2010

(54) VERTICALLY-MOUNTED GARAGE DOOR OPERATOR

(75) Inventor: Troy A. Anderson, Blacksburg, VA (US)

(73) Assignee: Aspen Motion Technologies, Inc., Radford, VA (US)

( * ) Notice: Subject to any disclaimer, the term of this patent is extended or adjusted under 35 U.S.C. 154(b) by 332 days.

(21) Appl. No.: 11/724,683

(22) Filed: Mar. 15, 2007

(65) Prior Publication Data

US 2007/0262739 A1 Nov. 15, 2007

Related U.S. Application Data

(60) Provisional application No. 60/743,488, filed on Mar. 15, 2006.

(51) Int. Cl.
*G05D 3/00* (2006.01)

(52) U.S. Cl. ....................... 318/470; 318/286; 318/369; 318/466; 49/26; 49/28

(58) Field of Classification Search ................. 318/470, 318/286, 369, 466, 396; 49/26, 28; 160/193
See application file for complete search history.

(56) References Cited

U.S. PATENT DOCUMENTS

| | | | | | |
|---|---|---|---|---|---|
| 4,311,225 | A * | 1/1982 | Tsubaki et al. | 192/142 R |
| 4,408,146 | A * | 10/1983 | Beckerman | 318/264 |
| 4,564,098 | A * | 1/1986 | Hormann | 192/150 |
| 4,597,428 | A * | 7/1986 | Iha | 160/188 |
| 4,638,433 | A | 1/1987 | Schindler | |
| 4,653,565 | A * | 3/1987 | Iha et al. | 160/193 |
| 5,222,403 | A | 6/1993 | Angelini et al. | |
| 5,278,480 | A | 1/1994 | Murray | |
| 5,780,987 | A | 7/1998 | Fitzgibbon et al. | |
| 5,790,034 | A | 8/1998 | Khoury | |
| 5,803,149 | A * | 9/1998 | Halley et al. | 160/201 |
| 5,920,159 | A * | 7/1999 | Miller et al. | 318/4 |
| 6,097,166 | A | 8/2000 | Fitzgibbon et al. | |
| 6,107,765 | A | 8/2000 | Fitzgibbon et al. | |
| 6,111,374 | A | 8/2000 | Fitzgibbon et al. | |
| 6,310,451 | B1 | 10/2001 | Fitzgibbon et al. | |
| 6,340,872 | B1 | 1/2002 | Fitzgibbon et al. | |
| RE37,784 | E | 7/2002 | Fitzgibbon et al. | |
| 6,528,961 | B1 | 3/2003 | Fitzgibbon et al. | |
| 6,566,828 | B2 | 5/2003 | Fitzgibbon et al. | |
| 6,719,033 | B2 | 4/2004 | Stoltenberg | |
| 6,842,112 | B2 * | 1/2005 | Pulis et al. | 340/524 |
| 6,873,127 | B2 | 3/2005 | Murray | |
| 7,034,486 | B1 | 4/2006 | McMahon | |
| 7,061,197 | B1 * | 6/2006 | Mullet et al. | 318/466 |
| 7,075,256 | B2 | 7/2006 | Murray | |
| 2002/0084759 | A1 | 7/2002 | Fitzgibbon et al. | |
| 2003/0025470 | A1 | 2/2003 | Fitzgibbon et al. | |
| 2003/0210005 | A1 | 11/2003 | Murray | |
| 2004/0261317 | A1 | 12/2004 | Murray | |
| 2005/0146298 | A1 | 7/2005 | Murray | |
| 2006/0138987 | A1 | 6/2006 | McMahon | |
| 2006/0237150 | A1 | 10/2006 | Olmsted | |

* cited by examiner

*Primary Examiner*—Rita Leykin
(74) *Attorney, Agent, or Firm*—Greenberg Traurig, LLC

(57) ABSTRACT

Embodiments of the invention provide a control system for a garage door. The control system can include a motor, a pulley, a synchronous drive member, a carriage, and an operator. The pulley can be coupled to and driven by the motor. The synchronous drive member can be coupled to the pulley and driven by the pulley. The carriage can be coupled to the synchronous drive member and to a bottom edge of a garage door. The operator can be coupled to the motor and can control the motor. The operator can be mounted vertically adjacent to the garage door when the garage door is in a closed position.

16 Claims, 3 Drawing Sheets

VERTICALLY-MOUNTED GARAGE DOOR OPERATOR

RELATED APPLICATIONS

This application claims priority to U.S. Provisional Patent Application No. 60/743,488, filed on Mar. 15, 2006, the entire contents of which is herein incorporated by reference.

BACKGROUND OF THE INVENTION

Two types of garage door or moveable barrier operators are generally marketed for use in residential applications. A first type of garage door operator includes an overhead operator, and a second type of garage door operator includes a torsion bar mounted operator. Overhead operators can operate extension spring and torsion spring counter-balanced garage doors. Torsion bar mounted operators, however, can only be used on garage doors that use torsion counter balance springs. Some users prefer torsion bar mounted operators, because overhead operators, once installed, consume an area that is often in plain sight that can be considered an eye sore. In contrast, torsion bar mounted operators are mounted above the garage door opening and, therefore, are generally mounted out of sight.

Torsion bar mounted operators can monitor the force required for opening a garage door, but generally do not measure the force required to close a garage door. One conventional torsion bar mounted operator attempts to measure the force required to close a garage door while a garage door is closing. The operator, however, requires special fitting of a track guide system. In addition, operators that can be used interchangeably with both torsion spring systems and extension spring systems do not precisely measure the force required to open and/or close a garage door. Although some torsion bar mounted operators claim to measure the force required to close a garage door while the garage door is closing, the operators generally do not consider or take into account additional loading that can occur on a garage door. For example, if ice builds up on a garage door, conventional operators do not account for the additional force required due to the added weight of the ice, which can be a safety concern.

In addition, torsion bar operators generally cannot prevent the opening of a garage door when the door is in the closed position since the counter balance cables are not rigid. One method currently used to lock a garage door controlled with by torsion bar mounted operator requires the addition of a solenoid lock.

SUMMARY OF THE INVENTION

Embodiments of the invention generally relate to control systems for moveable barriers or garage doors. One embodiment of a control system includes a motor, a pulley, a synchronous drive member, a carriage, and an operator. The pulley is coupled to and driven by the motor. The synchronous drive member is coupled to the pulley and is driven by the pulley. The carriage is connected to the synchronous drive member and to a bottom edge of a garage door. The operator is coupled to the motor and controls the motor. The operator is mounted vertically adjacent to the garage door when the garage door is in a closed position.

Embodiments of the invention provide a control system for a garage door that includes a torsion spring, a motor, a motor worm gear, a pulley, a toothed synchronous drive member, a carriage, and an operator. The pulley is coupled to and driven by the motor. The toothed synchronous drive member is coupled to and driven by the pulley. The carriage is coupled to the synchronous drive member and to a bottom edge of a garage door. The operator is coupled to the motor and controls the motor and is mounted vertically adjacent to the garage door when the garage door is in a closed position. The toothed synchronous drive member and the motor worm gear substantially prevent back driving of the synchronous toothed drive member and the motor when an external force is applied to the garage door.

Additional embodiments of the invention provide a control system for a garage door that includes an operator configured to operate with torsion spring garage door systems and extension spring garage door systems. The operator determines a force needed to move a garage door and stops movement of the garage door if the force exceeds the predetermined force threshold.

DETAILED DESCRIPTION

Figure 1:
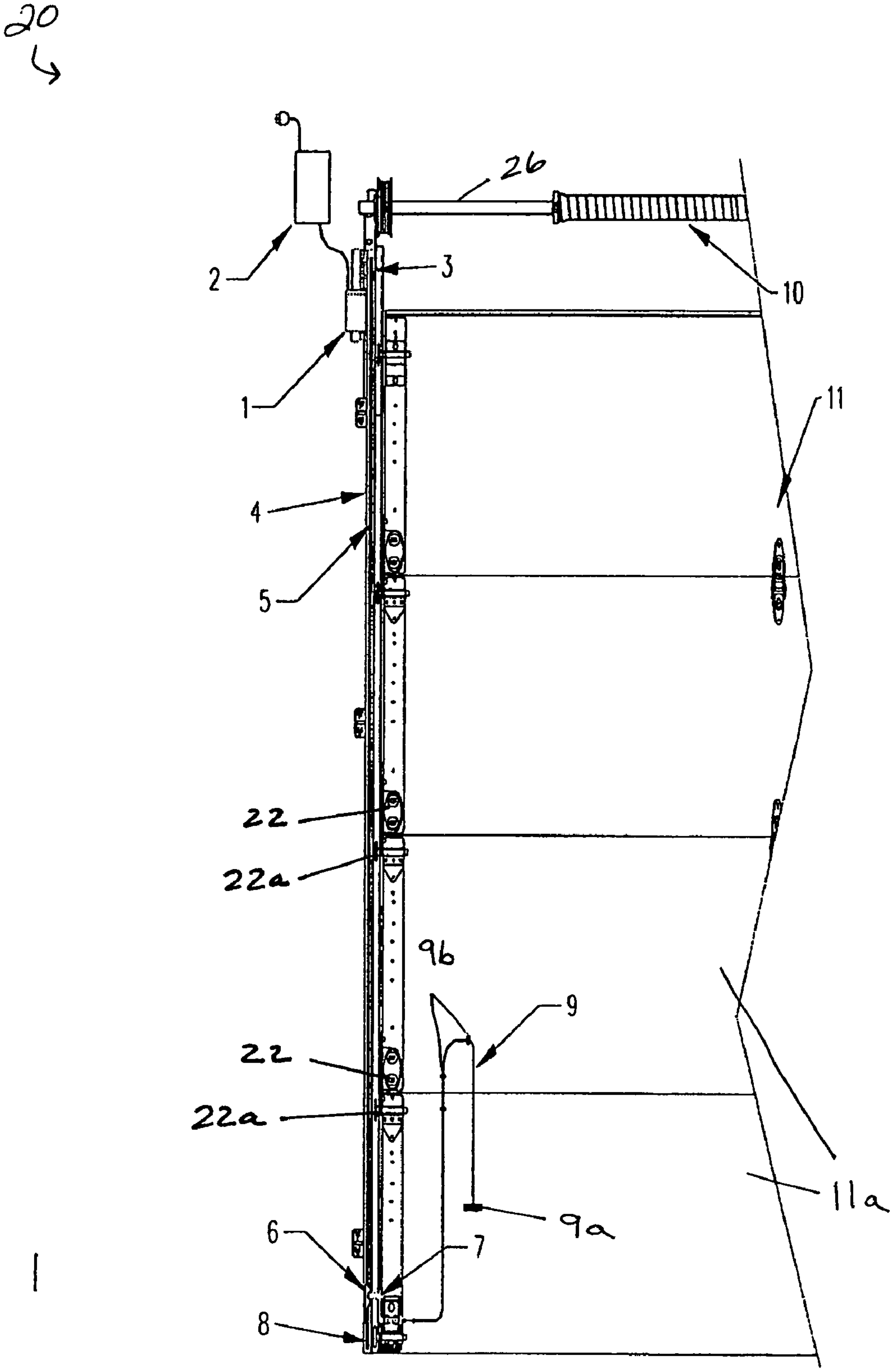
FIG. 1 illustrates a control system for a garage door, in a closed position, according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, embodiments of the invention can include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Figure 2:
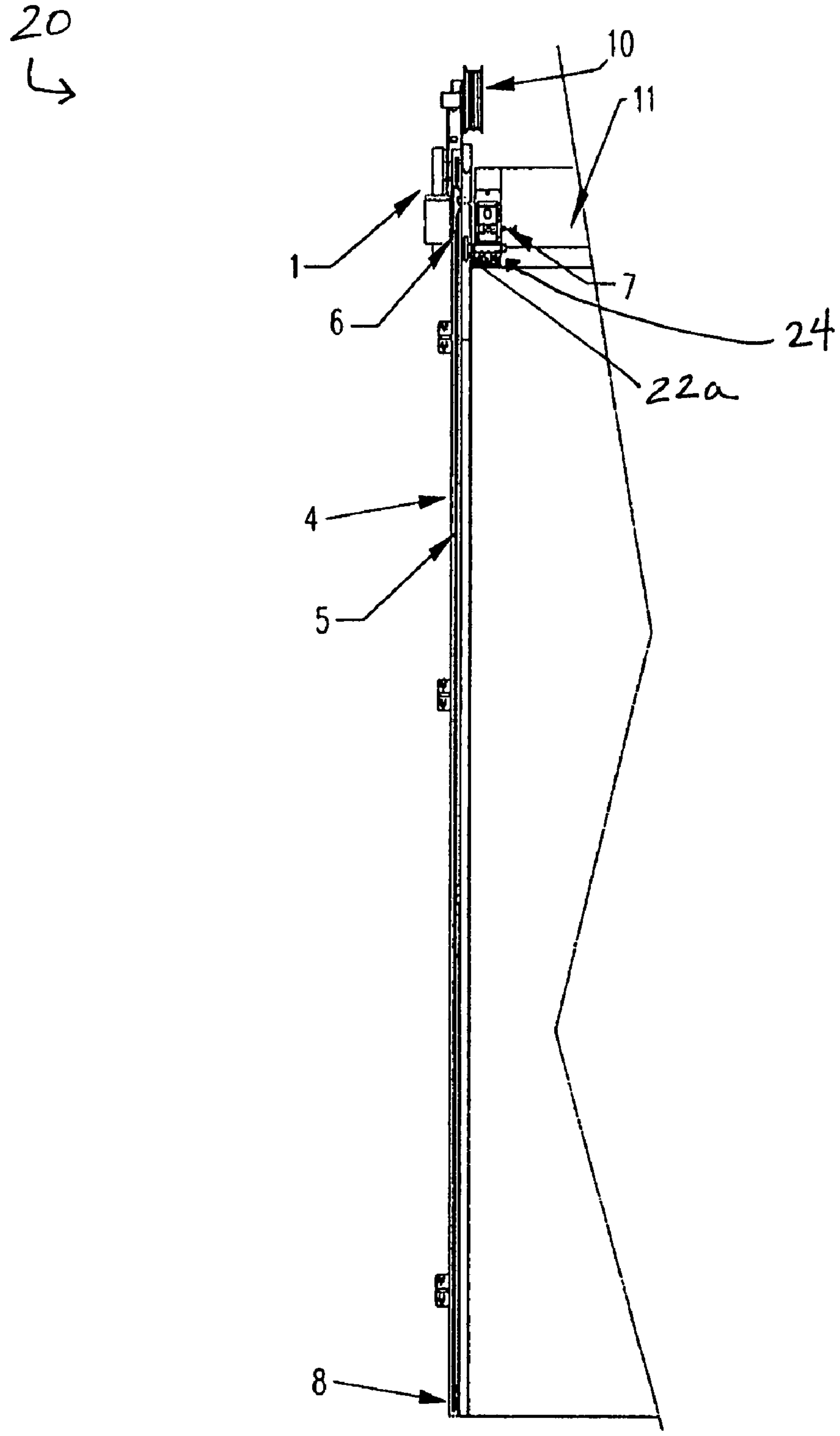
FIG. 2 illustrates the control system of FIG. 1 with the garage door in an open position.
Figure 3:
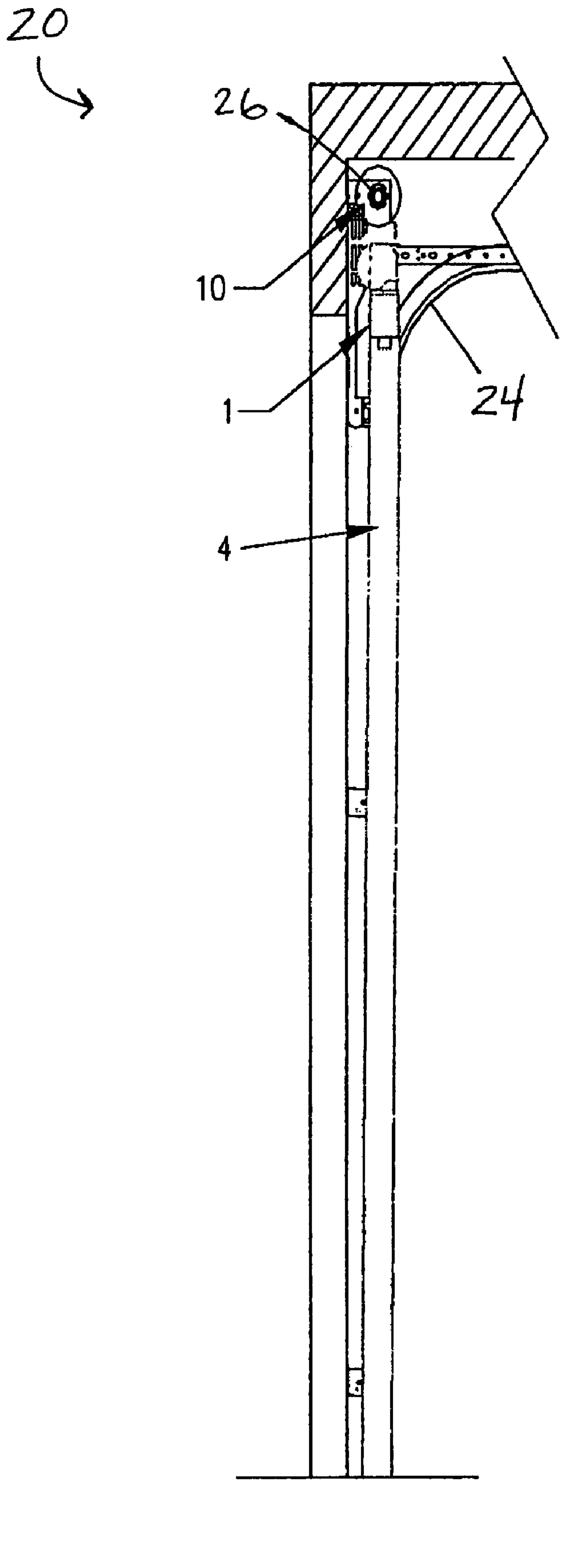
FIG. 3 is a side view of the control system of FIG. 1.

FIGS. 1-3 illustrate a control system 20 according to one embodiment of the invention for use with a garage door. Although the control system 20 illustrated in FIGS. 1-3 is shown with regard to a torsion spring system, the system 20 can also be used with extension spring systems. The control system 20 includes a motor 1. The motor 1 can be a brushless type motor. The motor 1 is controlled by an electronic control or operator 2. As shown in FIG. 1, the operator 2 can be mounted vertically adjacent to a garage door 11 when the garage door 11 is in a closed position. The operator 2 can monitor and control the operation of the motor 1. For example, the operator 2 can monitor the current supplied to the motor 1, the rotational position of the motor 1, and the operating temperature of the motor 1. The operator 2 can include one or more integrated circuits, programmable logic controllers, processors, and/or other combinations of hardware and/or software for monitoring and controlling the motor 1. For example, the operator 2 can include a processor and at least one memory module (not shown). The memory module can store instructions executed by the processor in order to monitor the operation of the motor 1. In some embodiments, the memory module can store operational data, such as distance thresholds, power thresholds, etc., that the operator 2 uses to monitor and control the garage door. The operational data can be loaded into the memory module during manufacture, during installation, and/or during operation of the control system 20. For example, the operator 2 can include an interface, such as a user interface, that can receive operational data from an external source. Operational data received via the interface can be stored in the memory module. In some embodiments, the memory module can store historical data associated with the control system 20, such as previous versions of operational data, usage data, installation data, etc.

As shown in FIGS. 1 and 2, the motor 1 can drive a drive sprocket or drive pulley 3. The drive pulley 3 can cause a synchronous drive member 5 (e.g., a chain or a belt) to move within a vertical frame 4 that supports the garage door 11. The garage door 11 can include a panel garage door, with a plurality of panels 11*a* connected (e.g., hinged) together. As shown in FIG. 1, a guide member 22 can be connected to the side of each panel 11*a*. The guide members 22 can include rollers 22*a* that engage with the vertical track 4. As the synchronous drive member 5 moves, the rollers 22*a* travel along the vertical track 4. As shown in FIG. 3, a horizontal track 24 can be connected to the top of the vertical track 4. The rollers 22*a* can engage the horizontal track 24 when the garage door 11 is moving toward or is in a horizontal or open position.

As shown in FIG. 1, one end of the synchronous drive member 5 can be coupled to the drive pulley 3, and the opposite end of the synchronous drive member 5 can be coupled to a driven sprocket or driven pulley 8 in order to provide tension for the synchronous drive member 5. The synchronous drive member 5 can also be connected to a carriage 6. The carriage 6 can move within the vertical frame 4 and can be selectively coupled to the garage door 11 via an engagement/release pin 7. When the engagement/release pin 7 is engaged with the carriage 6, the carriage 6 can transmit a lifting or lowering force to the garage door 11 as the synchronous drive member 5 is driven. When engaged with the carriage 6, the engagement/release pin 7 can pivot within the carriage 6 as the carriage 6 and the garage door 11 travel over the upper rail of the vertical track 14. When the engagement/release pin 7 is disengaged with the carriage 6, the carriage 6 can be disengaged from the garage door 11 in order to not transmit a lifting or lowering force to the garage door 11.

As shown in FIG. 1, the engagement/release pin 7 can be coupled to a safety release cable 9 that can allow the engagement/release pin 7 to be manually disengaged from the carriage 6. The release cable 9 can include a handle 9*a* and can be coupled to the garage door 11 via one or more connectors 9*b*. The connectors 9*b* can retain the engagement/release pin 7 attached to the garage door 11 when the pin 7 is disengaged from the carriage 6 (e.g., in order to prevent the pin 7 from being lost). In some embodiments, once the garage door 6 is disengaged from the carriage 6, the garage door 11 can be manually lifted or lowered. For example, if power is not available to operate the motor 1 and/or the operator 2, the garage door 11 can be disengaged from the carriage 6 so that it can be manually opened or closed.

As shown in FIG. 1, the control system 20 can also includes a torsion bar 26 that can be mounted above the garage door 11. Wrapped around the torsion bar 26 is a torsion spring 10. The torsion spring 10 counterbalances the weight of the garage door 11 as it is being lifted or opened. The garage door 11 can be balanced by adjusting the torsion spring 10 (or an extension spring in an extension spring system). Balanced garage doors generally require minimum force to open or close. For example, if a garage door is balanced, the force needed to raise or lower the door is substantially equal at the sides of the door and at the center of the door.

In some embodiments, the operator 2 can be calibrated during manufacture, installation, and/or use (e.g., after the garage door 11 is balanced). For example, the operator 2 can be calibrated and programmed with one or more travel thresholds that limit the travel of the garage door 11 (e.g., the distance that the garage door 11 is lifted and/or lowered). The operator 2 can also be calibrated and programmed with one or more force thresholds that limit the force exerted by the motor 1 to open and close the garage door 11. For example, the operator 2 can be programmed with a pre-determined threshold that limits the amount of power supplied to the motor 1 and consequently, the amount of force applied to the synchronous drive member 5, pulleys 3 and 8, and carriage 6 in order to open or close the garage door 11. In some embodiments, the operator 2 can include an interface, such as a user interface, that receives the travel threshold and/or the force threshold from an external source (e.g., a user).

After the garage door 11 is balanced and the operator 2 is calibrated, the garage door 11 can be opened and closed. As shown in FIG. 2, the carriage 6 can be connected to the side of the garage door 11 and, in particular, can be connected to a bottom edge of a bottom panel of the garage door 11. When the carriage 6 is connected to the bottom edge of the garage door 11, a lifting and/or lowering force is applied to the bottom of the garage door 11 in order to open or close the door 11. In some embodiments, applying a lifting or lowering force to the bottom of the garage door 11 allows the operator 2 to detect and react to obstructions faster and easier. For example, since the lifting and lowering force is applied closer to the point at which an obstruction will be encountered, changes in force required to move the garage door 11 resulting from obstructions in the travel path of the garage door can be more quickly and easily recognized.

During operation of the door 11, the operator 2 can monitor the travel position of the garage door 11 by monitoring the rotation or revolution position of the motor 1. For example, the operator 2 can count the revolutions of the motor 1, can divide the revolutions by the motor gearbox reduction ratio, and can multiply the result by the circumference of the driven pulley or sprocket to determine the travel position of the garage door 11. In some embodiments, the operator 2 can also use the revolutions or position of the motor 1 to determine and control other aspects of the motor 1. For example, the operator 2 can use the revolution position of the motor 1 to determine the revolutions per minute of the motor 1 or to control the commutation rate of the motor 1, which controls the speed in which the door travels.

The operator 2 can also determine or measure the force needed to open or close the garage door 11. For example, the operator 2 can calculate the force transmitted to the carriage 6 using the following equation:

$$(((Kt \times I) \times (Reduction))/Pitch\ Diameter)$$

where Kt is the motor torque constant (oz-in), I is the motor current (amperes), Reduction is the gearbox reduction ratio, and Pitch Diameter is the effective synchronous-drive-member-to-pulley (or sprocket) load transmission point. As the garage door 11 travels to an open position or to a closed position, the operator 2 can monitor the force and control the force by adjusting the power supplied to the motor 1. If, however, the power requirement for opening or closing a door exceeds a pre-established force threshold, the operator 2 can stop the travel of the garage door 11. In addition, if the power requirement for closing the garage door 11 exceeds the pre-established force threshold (e.g., due to an object obstructing the travel path of the garage door 11), the operator 2 can reverse the direction of travel of the garage door 11 (i.e., lift the door 11 to an open position) after stopping the downward movement of the garage door 11.

The control system 20 can also include a mechanism for locking the garage door 11 in a closed position. For example, when used in torsion spring systems, the synchronous drive member 5 can include a toothed synchronous drive member (e.g., a toothed belt) and a motor worm gear. The toothed synchronous drive member and the motor worm gear can substantially prevent back driving of the synchronous drive member 5 and, consequently, the motor 1, when an external force is applied to the garage door 11.

Various features of embodiments of the invention are set forth in the following claims.

The invention claimed is:

1. A control system for a garage door comprising:
- a motor;
- a pulley coupled to the motor and driven by the motor;
- a synchronous drive member coupled to the pulley and driven by the pulley;
- a carriage coupled to the synchronous drive member and a bottom edge of a garage door; and
- an operator coupled to the motor and controlling the motor, the operator mounted vertically adjacent to the garage door when the garage door is in a closed position, the operator monitoring a rotational position of the motor;
- the operator determining a force needed to move the garage door and stopping movement of the garage door if the force exceeds a predetermined threshold;
- the operator determining the force based on a current supplied to the motor and a torque constant of the motor;
- the operator determining the force by multiplying the torque constant of the motor by the current supplied to the motor to create a first result.

2. The control system of claim 1, wherein the operator determines all the force by multiplying the first result by a gearbox reduction ratio of the motor to create a second result.

3. The control system of claim 2, wherein the operator determines the force by dividing the second result by an effective synchronous drive member to pulley load transmission point.

4. A control system for a garage door comprising:
- a motor
- a pulley coupled to the motor and driven by the motor;
- a synchronous drive member coupled to the pulley and driven by the pulley;
- a carriage coupled to the synchronous drive member and a bottom edge of a garage door; and
- an operator coupled to the motor and controlling the motor, the operator mounted vertically adjacent to the garage door when the garage door is in a closed position, the operator monitoring a rotational position of the motor; and
- a pin selectively coupled to the carriage.

5. The control system of claim 4, wherein the operator determines a position of the garage door.

6. The control system of claim 5, wherein the operator determines a position of the garage door by at least one of counting revolutions of the motor, dividing the revolutions of the motor by a gearbox reduction ratio of the motor to determine a result, and multiplying the result by a circumference of the pulley.

7. The control system of claim 4, wherein the pin transfers force from the carriage to the garage door when the pin is coupled to the carriage.

8. The control system of claim 7, further comprising a release cable coupled to the pin.

9. The control system of claim 4, further comprising at least one of a torsion spring counter balance and an extension spring counter balance.

10. A control system for a garage door comprising:
- a motor;
- a pulley coupled to the motor and driven by the motor;
- a synchronous drive member coupled to the pulley and driven by the pulley;
- a carriage coupled to the synchronous drive member and a bottom edge of a garage door; and
- an operator coupled to the motor and controlling the motor, the operator mounted vertically adjacent to the garage door when the garage door is in a closed position, the operator monitoring a rotational position of the motor; and
- the operator being configured to operate with extension spring garage door systems and with torsion spring garage door systems.

11. A control system for a garage door, the control system comprising:
- a counter balance spring;
- a motor;
- a motor worm gear;
- a pulley coupled to the motor and driven by the motor;
- a toothed synchronous drive member coupled to and driven by the pulley;
- a carriage coupled to the synchronous drive member and a bottom edge of a garage door;
- an operator coupled to the motor and controlling the motor, the operator mounted vertically adjacent to the garage door when the garage door is in a closed position, the operator monitoring a rotational position of the motor;
- the toothed synchronous drive member and the motor worn gear substantially preventing back driving of the synchronous toothed drive member and the motor when an external force is applied to the garage door; and
- a pin selectively coupled to the carriage.

12. The control system of claim 11, wherein the pin transfers force from the carriage to the garage door when the pin is coupled to the carriage.

13. The control system of claim 12, further comprising a release cable coupled to the pin.

14. A control system for a garage door, the control system comprising:
- a motor;
- an operator configured to operate with torsion spring garage door systems and extension spring garage door systems, the operator coupled to the motor, the operator determining a force needed to move a garage door and stopping movement of the garage door if the force exceeds the predetermined force threshold, and the operator monitoring a current supplied to the motor.

15. The control system of claim 14, further comprising:

a pulley coupled to the motor and driven by the motor; a synchronous drive member coupled to the pulley and driven by the pulley; and a carriage coupled to the synchronous drive member and a bottom edge of the garage door.

16. The control system of claim 14, wherein the operator is mounted vertically adjacent to the garage door when the garage door is in a closed position.

* * * * *